US011323391B1

(12) United States Patent
McColgan et al.

(10) Patent No.: US 11,323,391 B1
(45) Date of Patent: May 3, 2022

(54) MULTI-PORT STREAM SWITCH FOR STREAM INTERCONNECT NETWORK

(71) Applicant: XILINX, INC., San Jose, CA (US)

(72) Inventors: Peter McColgan, Dublin (IE); David Clarke, Dublin (IE); Goran Hk Bilski, Molndal (SE); Juan J. Noguera Serra, San Jose, CA (US); Baris Ozgul, Dublin (IE); Jan Langer, Chemnitz (DE); Tim Tuan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 112 days.

(21) Appl. No.: 16/833,029

(22) Filed: Mar. 27, 2020

(51) Int. Cl.
*H04L 12/935* (2013.01)
*G06F 13/28* (2006.01)
*H04L 49/00* (2022.01)

(52) U.S. Cl.
CPC .............. *H04L 49/30* (2013.01); *G06F 13/28* (2013.01)

(58) Field of Classification Search
CPC ......... G06F 19/22; G06F 19/18; H04L 63/20; H04L 63/0263; H04L 47/41; H04L 47/2441
See application file for complete search history.

(56) References Cited

U.S. PATENT DOCUMENTS

| 2018/0189229 | A1 | 7/2018 | Desoli et al. |
| 2019/0266485 | A1 | 8/2019 | Singh et al. |
| 2019/0303033 | A1 | 10/2019 | Noguera Serra et al. |
| 2019/0303311 | A1 | 10/2019 | Bilski et al. |
| 2019/0303328 | A1 | 10/2019 | Balski et al. |
| 2020/0182036 | A1* | 6/2020 | Rangarajan ............. E21B 43/00 |
| 2020/0372665 | A1* | 11/2020 | Zhang ................... G01S 17/894 |
| 2021/0224179 | A1* | 7/2021 | Gunda .................. G06F 11/301 |

* cited by examiner

*Primary Examiner* — Iqbal Zaidi
(74) *Attorney, Agent, or Firm* — Patterson + Sheridan, LLP

(57) ABSTRACT

Some examples described herein relate to multi-port stream switches of data processing engines (DPEs) of an electronic device, such as a programmable device. In an example, a programmable device includes a plurality of DPEs. Each DPE of the DPEs includes a hardened processor core and a stream switch. The stream switch is connected to respective stream switches of ones of the DPEs that neighbor the respective DPE in respective ones of directions. The stream switch has input ports associated with each direction of the directions and has output ports associated with each direction of the directions. For each direction of the directions, each input port of the input ports associated with the respective direction is selectively connectable to one of the output ports associated with the respective direction.

20 Claims, 8 Drawing Sheets

MULTI-PORT STREAM SWITCH FOR STREAM INTERCONNECT NETWORK

TECHNICAL FIELD

This disclosure relates to a multi-port stream switch for a stream interconnect network on an electronic device.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

Circuit designs could be created by generating circuits using primitives and/or writing hardware description language (HDL) code. Configuration data is then generated from the primitives and/or HDL, including placing logic and routing between the placed logic. Various verification and validation methods could be implemented to ensure the proper functioning of the circuit design.

SUMMARY

Some examples described herein relate to multi-port stream switches of data processing engines (DPEs) of an electronic device, such as a programmable device. More specifically, examples described herein relate to simplified hardware architectures of multi-port stream switches that can be interconnected in a stream interconnect network of a DPE array. The number and complexity of circuit components can be reduced, which can also achieve a smaller area for the stream switch and reduced power consumption.

In an example, a programmable device includes a plurality of DPEs. Each DPE of the DPEs includes a hardened processor core and a stream switch. The stream switch is connected to respective stream switches of ones of the DPEs that neighbor the respective DPE in respective ones of directions. The stream switch has input ports associated with each direction of the directions and has output ports associated with each direction of the directions. For each direction of the directions, each input port of the input ports associated with the respective direction is selectively connectable to one of the output ports associated with the respective direction.

An example is a method for operating a programmable device. A DPE is configured. The DPE is one of a plurality of DPEs. Each DPE of the plurality of DPEs includes a hardened processor core and a stream switch. The stream switch is connected to respective stream switches of ones of the plurality of DPEs that neighbor the DPE in respective ones of directions. The stream switch has input ports associated with each direction of the directions and has output ports associated with each direction of the directions. For each direction of the directions, each input port of the input ports associated with the respective direction is selectively connectable to one of the output ports associated with the respective direction. Configuring the DPE includes configuring the stream switch of the DPE. A data stream is transmitted from an input port of the stream switch of the DPE to an output port of the stream switch of the DPE based on the configuration of the stream switch of the DPE.

In another example, a programmable device includes a plurality of DPEs. Each DPE of the DPEs includes a hardened processor core, a memory module, and a stream switch. The stream switch is connected to respective stream switches of ones of the DPEs that neighbor the respective DPE in respective ones of directions. The stream switch includes first input ports, first output ports, one or more second input ports, one or more second output ports, one or more third input ports, and one or more third output ports. The first input ports are associated with each direction of the directions and are connected to a stream switch of a respective one of the DPEs that neighbors the respective DPE in the respective direction. The first output ports are associated with each direction of the directions and are connected to a stream switch of a respective one of the DPEs that neighbors the respective DPE in the respective direction. The one or more second input ports are connected to the core. The one or more second output ports are connected to the core. The one or more third input ports are connected to the memory module. The one or more third output ports are connected to the memory module. For each direction of the directions, each first input port of the first input ports associated with the respective direction is selectively connectable to no more than one of the first output ports associated with the respective direction.

In a further example, a programmable device includes a plurality of DPEs. Each DPE of the DPEs includes a hardened processor core and a stream switch. The stream switch is connected to respective stream switches of ones of the DPEs that neighbor the respective DPE in respective ones of directions. The stream switch has stream input ports and stream output ports. The stream switch is configured to implement a less-than-full crossbar switch between the stream input ports and the stream output ports. For each direction of the directions, each stream input port of the stream input ports associated with the respective direction can be configurable to have a loop-back feature to no more than one of the stream output ports associated with the respective direction.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
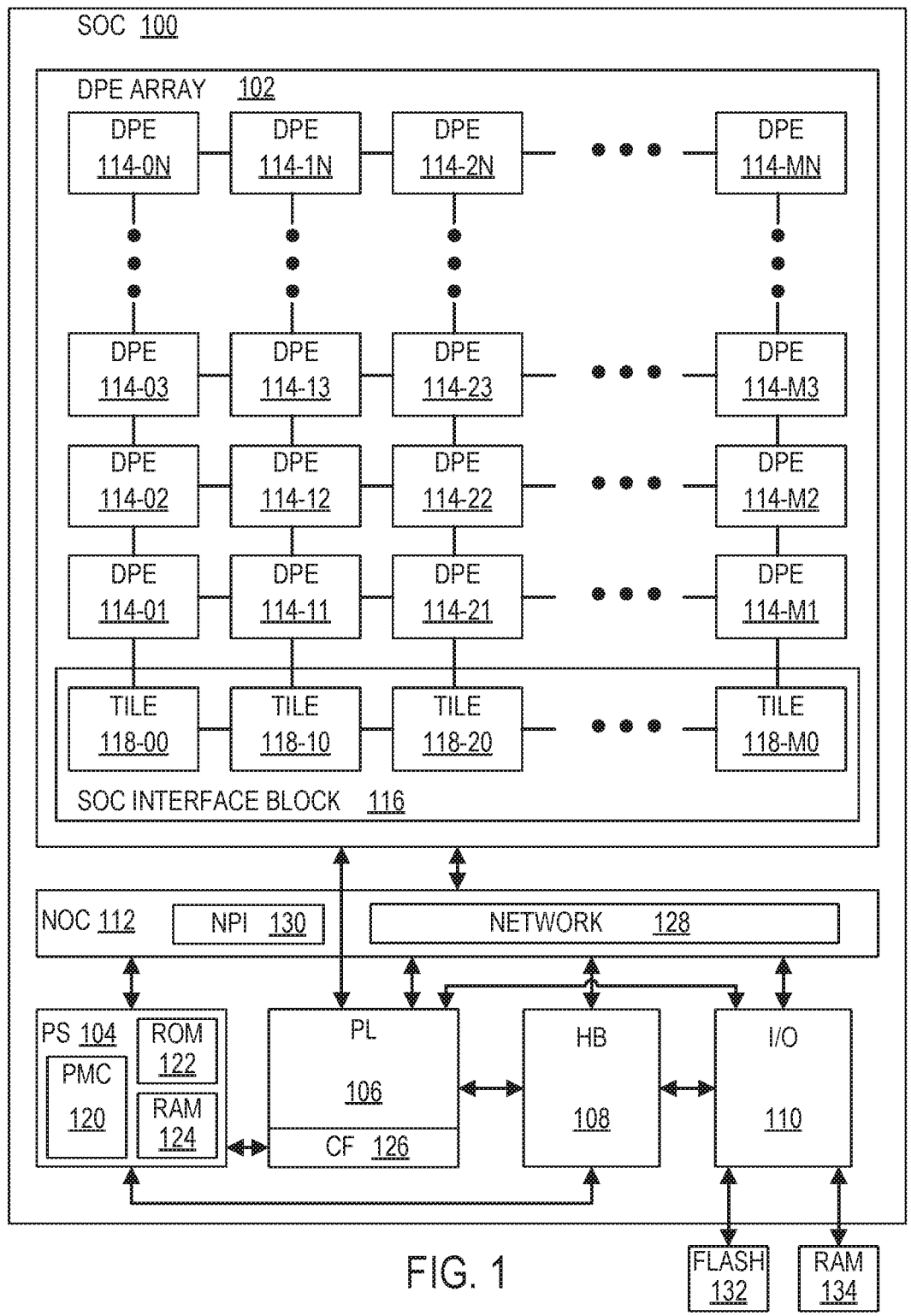
FIG. 1 illustrates an architecture for a programmable device according to some examples.

Some examples described herein relate to multi-port stream switches of data processing engines (DPEs) of an electronic device, such as a programmable device. More specifically, examples described herein relate to simplified hardware architectures of multi-port stream switches that can be interconnected in a stream interconnect network of a DPE array. A DPE array may include a plurality of DPEs. In general, a DPE can include a hardened processor core that is capable of providing data processing capabilities, a memory module that is accessible by the core, and a stream switch for communications of data streams. The DPE array can also include tiles that provide an interface between the DPE array and other subsystems of the programmable device that includes the DPE array. Each of the interface tiles can also include a stream switch. The stream switches of DPEs and interface tiles of the DPE array can be interconnected to form a stream interconnect network.

A stream switch of a DPE or interface tile includes multiple stream input ports and multiple stream output ports. The stream input and output ports of a stream switch are associated with directions along which the respective stream switch is connected to another stream switch of a neighboring DPE or interface tile. In illustrated examples herein, a stream switch can have (i) multiple stream input ports and multiple stream output ports associated with a north direction and connected to stream output ports and stream input ports, respectively, of a stream switch of a DPE or interface tile neighboring, to the north, the DPE or interface tile in which the stream switch is disposed; (ii) multiple stream input ports and multiple stream output ports associated with an east direction and connected to stream output ports and stream input ports, respectively, of a stream switch of a DPE or interface tile neighboring, to the east, the DPE or interface tile in which the stream switch is disposed; (iii) multiple stream input ports and multiple stream output ports associated with a south direction and connected to stream output ports and stream input ports, respectively, of a stream switch of a DPE or interface tile neighboring, to the south, the DPE or interface tile in which the stream switch is disposed; and (iv) multiple stream input ports and multiple stream output ports associated with a west direction and connected to stream output ports and stream input ports, respectively, of a stream switch of a DPE or interface tile neighboring, to the west, the DPE or interface tile in which the stream switch is disposed. For a stream switch disposed in a DPE, the stream switch can have one or more stream input port and one or more stream output port connected to the core of the DPE. For a stream switch disposed in a DPE, the stream switch can have one or more stream input port and one or more stream output port connected to the memory module (e.g., direct memory access (DMA) engine)) of the DPE.

The stream switch of the DPE or interface tile implements a less-than-full crossbar switch between the multiple stream input ports and multiple stream output ports. A full crossbar switch permits each input port to be selectively connectable to any and each output port. In some examples, a loopback feature of the stream switch can be reduced such that the less-than-full crossbar switch is implemented. For example, within a stream switch, each stream input port associated with a direction can be selectively connectable to one (e.g., no more than one) respective stream output port associated with that same direction. In illustrated examples, for a stream switch, (i) each stream input port associated with a north direction is selectively connectable to one respective output port associated with the north direction; (ii) each stream input port associated with an east direction is selectively connectable to one respective output port associated with the east direction; (iii) each stream input port associated with a south direction is selectively connectable to one respective output port associated with the south direction; and (iv) each stream input port associated with a west direction is selectively connectable to one respective output port associated with the west direction. In some examples, for a stream switch, each stream input port associated with a given direction is selectively connectable to each and every stream output port associated with every other direction. In some examples, for a stream switch, each stream input port associated with a given direction is selectively connectable to a respective one (e.g., no more than one) stream output port associated with each other direction. In some examples, each stream input port and stream output port associated with any direction is selectively connectable to any stream output port and stream input port connected to a component local to the DPE, such as the core or the memory module.

A stream switch implementing a less-than-full crossbar switch as summarized above can have a simplified hardware architecture. The number and complexity of circuit components can be reduced to implement such a less-than-full crossbar switch. This reduction and simplification can also achieve a smaller area for the stream switch and reduced power consumption. Further the stream switch can maintain sufficient flexibility for different configurations for different use cases and applications.

Aspects of these and other examples are described below. Additional or other benefits may be achieved by various examples, as a person having ordinary skill in the art will readily understand upon reading this disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Even further, various directions or orientations are described as, e.g., a column and a row; horizontal and vertical; bottom or below, top or above, left, and right; and south, north, west, and east. These designations are for ease of description, and other directions or orientations may be implemented.

FIG. 1 illustrates an architecture for a programmable device according to some examples. In these examples, the programmable device is a System-on-Chip (SoC) 100. The architecture can be modified with any number of variations, some of which may be identified in the following description.

The SoC 100 includes a plurality of subsystems, including a DPE array 102, a processing system (PS) 104, programmable logic (PL) 106, hard block circuits (HB) 108, input/output circuits (I/O) 110, and a Network-on-Chip (NoC) 112. In some examples, each sub-system includes at least some component or circuit that is programmable, such as described herein. In some examples, some of the subsystems can include a non-programmable application-specific circuit. Other circuits can be included in the SoC 100, such as other IP blocks like a system monitor or others.

The DPE array 102 includes a plurality of interconnected DPEs 114-01 through 114-MN (collectively or individually, DPE(s) 114). Each of the DPEs 114 is a hardened circuit block and may be programmable. Each of the DPEs 114 can include the architecture as illustrated in and described below with respect to FIG. 2. In the example of FIG. 1, the DPE array 102 includes a two-dimensional array of DPEs 114 and a SoC interface block 116. The DPE array 102 may be implemented using any of a variety of different architectures. FIG. 1 illustrates DPEs 114 arranged in aligned rows and aligned columns. The DPE array 102 has M+1 columns of DPEs 114 and N rows of DPEs 114. The reference numerals of the DPEs 114 in FIG. 1 indicate the positioning of each DPE 114 by the reference number "114-[column][row]." In some examples, DPEs 114 may be arranged where DPEs 114 in selected rows and/or columns are horizontally inverted or flipped relative to DPEs 114 in adjacent rows and/or columns. In other examples, rows and/or columns of DPEs 114 may be offset relative to adjacent rows and/or columns.

As described in more detail below, the DPEs 114 can communicate various data by different mechanisms within the DPE array 102. The DPEs 114 are connected to form a DPE interconnect network. To form the DPE interconnect network, each DPE 114 is connected to vertically neighboring DPE(s) 114 and horizontally neighboring DPE(s) 114. For example, DPE 114-12 is connected to vertically neighboring DPEs 114 within column 1, which are DPEs 114-11 and 114-13, and is connected to horizontally neighboring DPEs 114 within row 2, which are DPEs 114-02 and 114-22. DPEs 114 at a boundary of the DPE array 102 may be connected to fewer DPEs 114. The DPE interconnect network includes a stream interconnect network and a memory mapped interconnect network. The stream interconnect network includes interconnected stream switches, and application data and direct memory accesses (DMAs) may be communicated between the DPEs 114 via the stream interconnect network. The memory mapped interconnect network includes interconnected memory mapped switches, and configuration and control data can be communicated between the DPEs 114 via the memory mapped interconnect network. Neighboring DPEs 114 can further communicate via shared memory. An independent cascade stream can be implemented between DPEs 114.

The DPE array 102 further includes the SoC interface block 116 that includes tiles 118-00 through 118-MO (collectively or individually, tile(s) 118). Each of the tiles 118 of the SoC interface block 116 may be hardened and programmable. Each of the tiles 118 can include the architecture as illustrated in and described below with respect to FIG. 3. The SoC interface block 116 provides an interface between DPEs 114 of DPE array 102 and other subsystems of the SoC 100, such as the NoC 112 and the PL 106.

In some examples, the SoC interface block 116 is coupled to adjacent DPEs 114. For example, as illustrated in FIG. 1, the SoC interface block 116 may be connected to each DPE 114 in the bottom row of DPEs 114-x1 in the DPE array 102 (where "x" indicates a given column). More particularly, in FIG. 1, each tile 118 of the SoC interface block 116 is connected to a neighboring DPE 114 within the column of the DPE array 102 in which the respective tile 118 is disposed. In FIG. 1, tile 118-00 is connected to DPE 114-01; tile 118-10 is connected to DPE 114-11; tile 118-20 is connected to DPE 114-21; etc. Additionally, each tile 118 is connected to neighboring tiles 118. The SoC interface block 116 is capable of communicating data through the tiles 118, e.g., of propagating data from tile 118-00 to tile 118-10, from tile 118-10 to tile 118-20, etc., and vice versa. A tile 118 within the SoC interface block 116 can communicate with a DPE 114 to which the tile 118 is connected, and the communication can be routed through the DPE interconnect network formed by the interconnected DPEs 114 to a target DPE 114.

Each tile 118 can service a subset of DPEs 114 in the DPE array 102. In the example of FIG. 1, each tile 118 services the column of DPEs 114 above the respective tile 118. The tiles 118 also include stream switches, which are interconnected in the stream interconnect network to stream switches of the DPEs 114, and memory mapped switches, which are interconnected in the memory mapped interconnect network to memory mapped switches of the DPEs 114. Communications from DPEs 114 can be communicated with the tile 118 below the respective DPEs 114 via the interconnected stream switches and/or memory mapped switches. The tile 118 can provide an interface to the PL 106 and/or the NoC 112 for communications therewith.

The PS 104 may be or include any of a variety of different processor types and number of processor cores. For example, the PS 104 may be implemented as an individual processor, e.g., a single core capable of executing program instruction code. In another example, the PS 104 may be implemented as a multi-core processor. The PS 104 may be implemented using any of a variety of different types of architectures. Example architectures that may be used to implement the PS 104 may include an ARM processor architecture, an x86 processor architecture, a graphics processing unit (GPU) architecture, a mobile processor architecture, a digital signal processor (DSP) architecture, or other suitable architecture that is capable of executing computer-readable program instruction code.

The PS 104 includes a platform management controller (PMC) 120, which may be a processor and/or processor core in the PS 104 capable of executing program instruction code. The PS 104 includes read-only memory (ROM) 122 (e.g., programmable ROM (PROM) such as eFuses, or any other ROM) and random access memory (RAM) 124 (e.g., static RAM (SRAM) or any other RAM). The ROM 122 stores program instruction code that the PMC 120 is capable of executing in a boot sequence. The ROM 122 further can store data that is used to configure the tiles 118. The RAM 124 is capable of being written to (e.g., to store program instruction code) by the PMC 120 executing program instruction code from the ROM 122 during the boot sequence, and the PMC 120 is capable of executing program instruction code stored in the RAM 124 during later operations of the boot sequence.

The PL 106 is logic circuitry that may be programmed to perform specified functions. As an example, the PL 106 may be implemented as fabric of an FPGA. The PL 106 can include programmable logic elements including configurable logic blocks (CLBs), look-up tables (LUTs), random access memory blocks (BRAM), Ultra RAMs (URAMs), input/output blocks (IOBs), digital signal processing blocks (DSPs), clock managers, and/or delay lock loops (DLLs). In some architectures, the PL 106 includes columns of programmable logic elements, where each column includes a single type of programmable logic element (e.g., a column of CLBs, a column of BRAMs, etc.). The programmable logic elements can have one or more associated programmable interconnect elements. For example, in some architectures, the PL 106 includes a column of programmable interconnect elements associated with and neighboring each column of programmable logic elements. In such examples, each programmable interconnect element is connected to an associated programmable logic element in a neighboring column and is connected to neighboring programmable interconnect elements within the same column and the neighboring columns. The interconnected programmable interconnect elements can form a global interconnect network within the PL 106.

The PL 106 has an associated configuration frame interconnect (CF) 126. A configuration frame node residing on the PMC 120 is connected to the CF 126. The PMC 120 sends configuration data to the configuration frame node, and the configuration frame node formats the configuration data in frames and transmits the frames through the CF 126 to the programmable logic elements and programmable interconnect elements. The configuration data may then be loaded into internal configuration memory cells of the programmable logic elements and programmable interconnect elements that define how the programmable elements are configured and operate. Any number of different sections or regions of PL 106 may be implemented in the SoC 100.

The HB 108 can be or include memory controllers (such as double data rate (DDR) memory controllers, high bandwidth memory (HBM) memory controllers, or the like), peripheral component interconnect express (PCIe) blocks, Ethernet cores (such as a 100 Gbps (C=100) media address controller (CMAC), a multi-rate MAC (MRMAC), or the like), forward error correction (FEC) blocks, Analog-to-Digital Converters (ADC), Digital-to-Analog Converters (DAC), and/or any other hardened circuit. The I/O 110 can be implemented as eXtreme Performance Input/Output (XPIO), multi-gigabit transceivers (MGTs), or any other input/output blocks. Any of the HB 108 and/or I/O 110 can be programmable.

The NoC 112 includes a programmable network 128 and a NoC peripheral interconnect (NPI) 130. The programmable network 128 communicatively couples subsystems and any other circuits of the SoC 100 together. The programmable network 128 includes NoC packet switches and interconnect lines connecting the NoC packet switches. Each NoC packet switch performs switching of NoC packets in the programmable network 128. The programmable network 128 has interface circuits at the edges of the programmable network 128. The interface circuits include NoC master units (NMUs) and NoC slave units (NSUs). Each NMU is an ingress circuit that connects a master circuit to the programmable network 128, and each NSU is an egress circuit that connects the programmable network 128 to a slave endpoint circuit. NMUs are communicatively coupled to NSUs via the NoC packet switches and interconnect lines of the programmable network 128. The NoC packet switches are connected to each other and to the NMUs and NSUs through the interconnect lines to implement a plurality of physical channels in the programmable network 128. The NoC packet switches, NMUs, and NSUs include register blocks that determine the operation of the respective NoC packet switch, NMU, or NSU.

A physical channel can also have one or more virtual channels. The virtual channels can implement weights to prioritize various communications along any physical channel. The NoC packet switches also support multiple virtual channels per physical channel. The programmable network 128 includes end-to-end Quality-of-Service (QoS) features for controlling data-flows therein. In examples, the programmable network 128 first separates data-flows into designated traffic classes. Data-flows in the same traffic class can either share or have independent virtual or physical transmission paths. The QoS scheme applies multiple levels of priority across traffic classes. Within and across traffic classes, the programmable network 128 applies a weighted arbitration scheme to shape the traffic flows and provide bandwidth and latency that meets the user requirements.

The NPI 130 includes circuitry to write to register blocks that determine the functionality of the NMUs, NSUs, and NoC packet switches. The NPI 130 includes a peripheral interconnect coupled to the register blocks for programming thereof to set functionality. The register blocks in the NMUs, NSUs, and NoC packet switches of the programmable network 128 support interrupts, QoS, error handling and reporting, transaction control, power management, and address mapping control. The NPI 130 includes an NPI root node residing on the PMC 120, interconnected NPI switches connected to the NPI root node, and protocol blocks connected to the interconnected NPI switches and a corresponding register block.

To write to register blocks, a master circuit, such as the PMC 120, sends configuration data to the NPI root node, and the NPI root node packetizes the configuration data into a memory mapped write request in a format implemented by the NPI 130. The NPI transmits the memory mapped write request to interconnected NPI switches, which route the request to a protocol block connected to the register block to which the request is directed. The protocol block can then translate the memory mapped write request into a format implemented by the register block and transmit the translated request to the register block for writing the configuration data to the register block.

The NPI 130 may be used to program any programmable boundary circuit of the SoC 100. For example, the NPI 130 may be used to program any HB 108 and/or I/O 110 that is programmable.

Various subsystems and circuits of the SoC 100 are communicatively coupled by various communication mechanisms. Some subsystems or circuits can be directly connected to others. As illustrated the I/O 110 is directly connected to the HB 108 and PL 106, and the HB 108 is further directly connected to the PL 106 and the PS 104. The PL 106 is directly connected to the DPE array 102. The DPE array 102, PS 104, PL 106, HB 108, and I/O 110 are communicatively coupled together via the programmable network 128 of the NoC 112.

The programmable device illustrated in FIG. 1 can be implemented in a single monolithic integrated circuit (IC) chip, or can be implemented distributed across multiple IC chips. When implemented in multiple IC chips, the IC chips can be stacked on each other, where neighboring chips are bonded (e.g., by hybrid oxide-to-oxide and metal-to-metal bonding) to each other or are attached to each other by external connectors (e.g., minibumps or microbumps). In other examples when implemented in multiple IC chips, the chips can be attached to a common substrate, such as an interposer or a package substrate. In some examples, one chip (e.g., a base chip) can include the PS 104, HB 108, I/O 110, and NoC 112, another one or more chips (e.g., fabric chips) can include the PL 106, and a further one or more chips (e.g., DPE chips) can include the DPE array 102. In a specific example, a chip stack includes a base chip, one or more fabric chips, and a DPE chip, where neighboring chips are bonded together by hybrid bonding, and the one or more fabric chips are disposed in the chip stack between the base chip and the DPE chip.

DPEs 114 and tiles 118 may be programmed by loading configuration data into configuration registers that define operations of the DPEs 114 and tiles 118, by loading configuration data (e.g., program instruction code) into program memory for execution by the DPEs 114, and/or by loading application data into memory banks of the DPEs 114. The PMC 120 can transmit configuration data and/or application data via the programmable network 128 of the NoC 112 to one or more tiles 118 in the SoC interface block 116 of the DPE array 102. At each tile 118 that receives configuration data and/or application data, the configuration data and/or application data received from the programmable network 128 is converted into a memory mapped packet that is routed via the memory mapped interconnect network to a configuration register, program memory, and/or memory bank addressed by the memory mapped packet (and hence, to a target DPE 114 or tile 118). The configuration data and/or application data is written to the configuration register, program memory, and/or memory bank by the memory mapped packet.

Using a DPE array 102 as described herein in combination with one or more other subsystems provides heterogeneous processing capabilities of the SoC 100. The SoC 100 may have increased processing capabilities while keeping area usage and power consumption low. For example, the DPE array 102 may be used to hardware accelerate particular operations and/or to perform functions offloaded from one or more of the subsystems of the SoC 100. When used with a PS 104, for example, the DPE array 102 may be used as a hardware accelerator. The PS 104 may offload operations to be performed by the DPE array 102 or a portion thereof. In other examples, the DPE array 102 may be used to perform computationally resource intensive operations.

In some examples, the SoC 100 can be communicatively coupled to other components. As illustrated, the SoC 100 is communicatively coupled to flash memory 132 and to RAM 134 (e.g., DDR dynamic RAM (DDRDRAM)). The flash memory 132 and RAM 134 may be separate chips and located, e.g., on a same board (e.g., evaluation board) as the SoC 100. The flash memory 132 and the RAM 134 are communicatively coupled to the I/O 110, which is connected to HB 108 (e.g., one or more memory controllers). The HB 108 is connected to the PS 104 (e.g., the PMC 120). The PMC 120 is capable of reading data from the flash memory 132 via the HB 108 and I/O 110, and writing the read data to local RAM 124 and/or, via the HB 108 and I/O 110, to the RAM 134.

Figure 2:
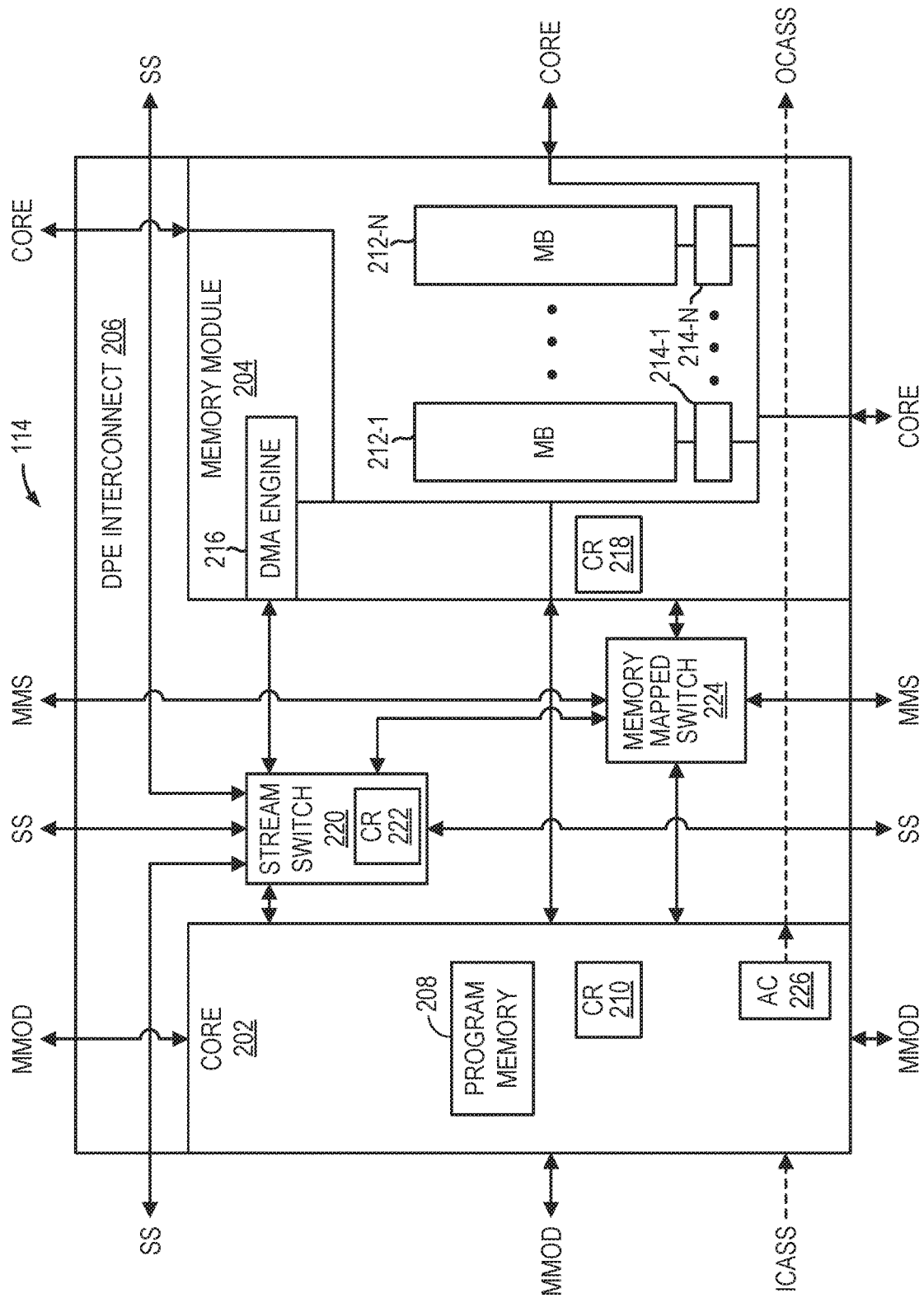
FIG. 2 depicts an architecture for a data processing engine (DPE) according to some examples.

FIG. 2 illustrates an architecture for a DPE 114 according to some examples. In the example of FIG. 2, DPE 114 includes a hardened processor core 202, a memory module 204, and DPE interconnect network 206.

The core 202 provides data processing capabilities of the DPE 114. The core 202 may be implemented as any of a variety of different processing circuits. In some examples, the core 202 is implemented as a processor that is capable of executing program instruction code, e.g., computer readable program instruction code. Program memory 208 is included in the core 202 and is capable of storing program instruction code that is executed by the core 202. The core 202, for example, may be implemented as a CPU, a GPU, a DSP, a vector processor, or another type of processor that is capable of executing program instruction code. The core 202 may include configuration registers (CR) 210 that may be loaded with configuration data to control operation of core 202. In some examples, the core 202 may be activated and/or deactivated based upon configuration data loaded into the configuration registers 210.

The memory module 204 includes memory banks 212-1 to 212-N. The memory banks 212-1 to 212-N are capable of storing data that may be read and consumed by one or more core and data (e.g., results) that may be written by one or more core. In some examples, each memory bank 212 is single-ported thereby allowing up to one access to each memory bank each clock cycle. In other examples, each memory bank 212 is dual-ported or multi-ported thereby allowing a larger number of parallel accesses each clock cycle. Each of memory banks 212-1 through 212-N has an arbiter 214-1 through 214-N. Each arbiter 214 may include arbitration logic. Further, each arbiter 214 may provide access through a crossbar.

The memory module 204 further includes DMA engine 216. In some examples, DMA engine 216 is capable of (i) receiving input data streams from the DPE interconnect network 206 and writing the received data to memory banks 212, and (ii) reading data from memory banks 212 and sending the data out via the DPE interconnect network 206, as described below. Through DMA engine 216, application data may be received from other sources (e.g., other subsystems or any DPE 114) within the SoC 100 and stored in the memory module 204. Through DMA engine 216, data may be read from the memory banks 212 of memory module 204 and sent to other destinations (e.g., other subsystems or any DPE 114). The memory module 204 may include configuration registers (CR) 218 that may be loaded with configuration data to control operation of the memory module 204. More specifically, the DMA engine 216 may be controlled by the configuration registers 218.

The DPE interconnect network 206 in the DPE 114 facilitates communication with one or more other DPEs and/or with other subsystems of the SoC 100. The DPE interconnect network 206 further enables communication of configuration and control data with the DPE 114. In some examples, the DPE interconnect network 206 is implemented as an on-chip interconnect, such as an Advanced Microcontroller Bus Architecture (AMBA) eXtensible Interface (AXI) bus (e.g., or switch) and/or other interconnect circuitry.

The DPE interconnect network 206 includes a stream interconnect network and a memory mapped interconnect network. The stream interconnect network is capable of exchanging data (e.g., application data) with other DPEs of DPE array 102 and/or other subsystems of the SoC 100 via data streams. The memory mapped interconnect network is capable of exchanging data such as configuration and control data for the DPE(s) via memory mapped packets.

The stream interconnect network of DPE interconnect network 206 includes a stream switch 220 in each DPE 114, and stream switches 220 of DPEs are interconnected in forming the stream interconnect network. The stream switch 220 is used to communicate with other DPEs and/or the SoC interface block 116. For example, the stream switch 220 can communicate with a stream switch (SS) in a DPE 114 or tile 118 in the SoC interface block 116 in each cardinal direction—e.g., to the left, above, right, and below. The stream switch 220 is capable of allowing non-neighboring DPEs to communicate with the core 202 and/or the memory module 204 via the stream interconnect network. The stream switch 220 can communicate with the core 202 and the memory module 204. The core 202 can therefore communicate with other DPEs 114 via the stream switch 220. The stream switch 220 can also communicate with the DMA engine 216 of the memory module 204, which permits other DPEs 114 to communicate with the DMA engine 216. Cores of other DPEs may directly access the memory banks 212 of the memory module via the stream switch 220 (and stream interconnect network) and the DMA engine 216. The stream switch 220 may include configuration registers (CR) 222 to which configuration data may be written that can dictate which other DPEs and/or subsystems (e.g., the PL 106 and/or the PS 104) the DPE 114 can communicate with via the stream switch 220 and can dictate operation of the stream switch 220 (e.g., establishing circuit-switched point-to-point connections or packet-switched connections).

The memory mapped interconnect network of DPE interconnect network 206 includes a memory mapped switch 224 in each DPE 114, and memory mapped switches 224 of DPEs are interconnected in forming the memory mapped interconnect network. The memory mapped switch 224 is used to exchange configuration and control data for the DPE 114. The memory mapped switch 224 is capable of receiving configuration data that is used to configure the DPE 114. The memory mapped switch 224 may receive configuration data from a memory mapped switch (MMS) of a DPE and/or a tile 118 located below DPE 114. The memory mapped switch 224 is capable of forwarding received configuration data to a memory mapped switch (MMS) of another DPE above DPE 114, to program memory 208 and/or configuration registers 210 within the core 202, to memory banks 212 and/or configuration registers 218 in the memory module 204, and/or to configuration registers 222 within the stream switch 220.

In some examples, the DPE array 102 is mapped to the address space of the PS 104. Accordingly, any configuration registers and/or memories within any DPE 114 may be accessed via the memory mapped interconnect network. For example, the program memory 208, the memory banks 212, and configuration registers 210, 218, 222 may be read and/or written via the memory mapped switch 224. Through the memory mapped interconnect network, subsystems of the SoC 100 are capable of reading an internal state of any configuration register 210, 218, 222, and are capable of writing configuration data to any configuration register 210, 218, 222. Through the memory mapped interconnect network, subsystems of the SoC 100 are capable of reading the program memory 208, and are capable of writing program instruction code to the program memory 208. Through the memory mapped interconnect network, subsystems of the SoC 100 are capable of reading data from and writing data to the memory bank 212 via the arbiters 214.

The memory module 204 is capable of communicating with a core (CORE) of a DPE 114 neighboring the memory module 204, and hence, is capable of operating as a shared memory that may be accessed by multiple DPEs. In the orientation of the example of FIG. 2, cores 202 of the illustrated DPE 114 and DPEs 114 above, to the right, and below the illustrated DPE 114 (e.g., cores that share a boundary with the memory module 204) can access the memory banks 212 through arbiters 214. Accordingly, in the example of FIG. 2, each core 202 or DPE 114 that has a shared boundary with the memory module 204 is capable of reading and writing to memory banks 212. If the orientation of the DPE 114 differs, orientations of cores that are capable of accessing the memory module 204 can differ.

The core 202 is capable of communicating with a memory module (MMOD) neighboring the core 202, and hence, is capable of accessing memory modules of other neighboring DPEs. In the orientation of the example of FIG. 2, the core 202 of the illustrated DPE 114 can access the memory modules of the illustrated DPE 114 and DPEs 114 above, to the left, and below the illustrated DPE 114 (e.g., memory modules that share a boundary with the core 202). Accordingly, in the example of FIG. 2, the core 202 is capable of reading and writing to any of the memory modules of DPEs that share a boundary with the core 202. The core 202 is capable of directing the read and/or write requests to the appropriate memory module based upon the addresses that are generated. If the orientation of the DPE 114 differs, orientations of memory modules that are capable of being accessed the core 202 can differ.

The core 202 may also include cascade interfaces, each of which is capable of providing direct communication with another core. The core 202 receives an input data stream (ICASS) directly from the core of the DPE to the left of the illustrated DPE 114. The received data stream may be provided to the data processing circuitry within core 202. The core 202 is capable of sending an output data stream (OCASS) directly to the core of the DPE to the right of the illustrated DPE 114. Each cascade interface may include a first-in-first-out (FIFO) interface for buffering. A cascade interface is capable of outputting to another core the contents of an accumulator register (AC) 226 in the core 202 and may do so each clock cycle. Accumulator register 226 may store data that is generated and/or being operated upon by data processing circuitry within core 202. The cascade interfaces may be programmed based upon configuration data loaded into the configuration registers 210 (e.g., activated or deactivated). In some other examples, the cascade interfaces are controlled by the core 202. For example, the core 202 may include program instruction code to read/write to the cascade interface(s).

Figure 3:
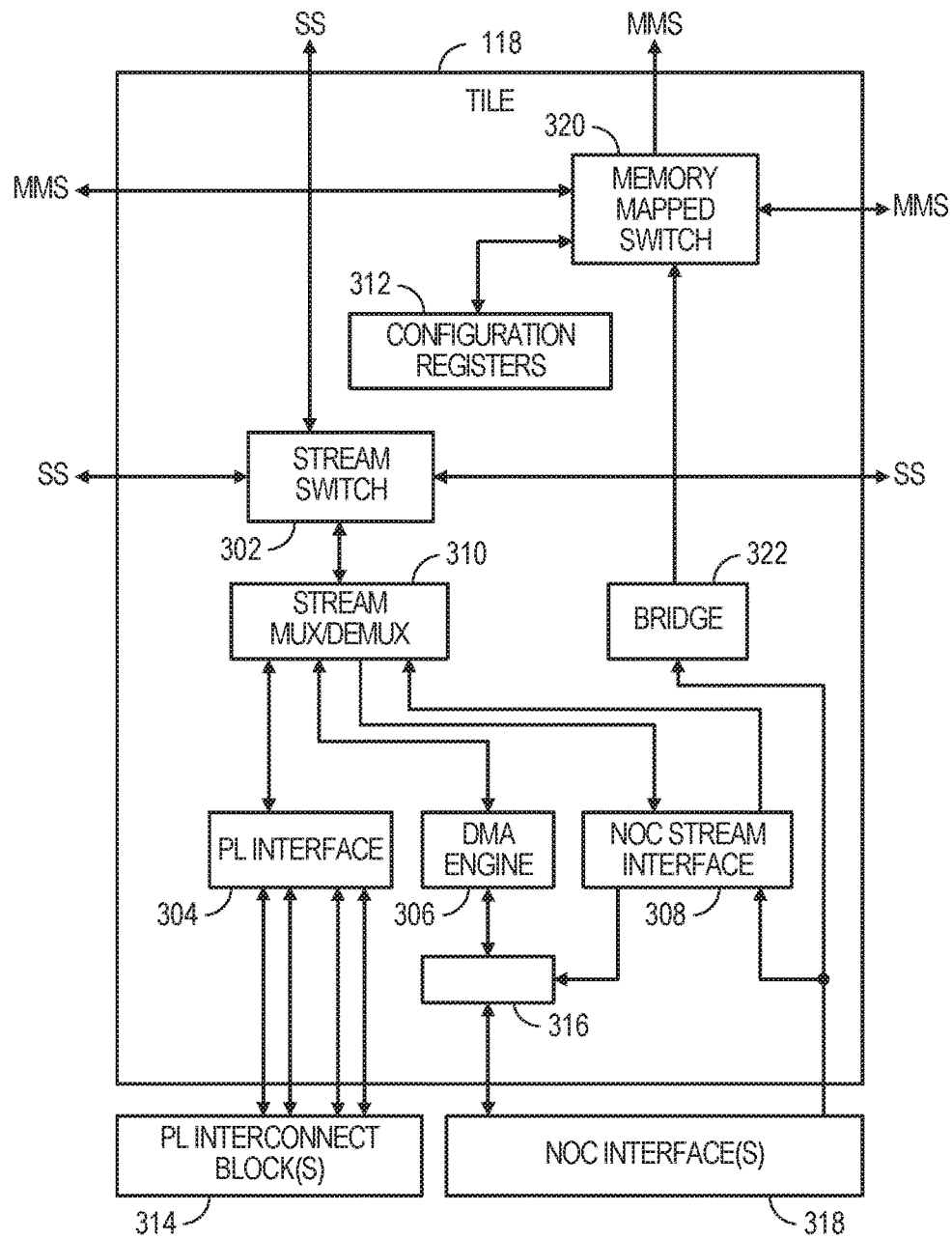
FIG. 3 depicts an architecture for a tile of a System-on-Chip (SoC) interface block according to some examples.

FIG. 3 illustrates an architecture for a tile 118 of the SoC interface block 116 according to some examples. In other implementations of a tile 118, a tile 118 may include additional or less circuitry and/or functionality. The tile 118 includes a stream switch 302. Stream switch 302 is connected horizontally to respective stream switches (SS) in neighboring tiles 118 and vertically to a stream switch (SS) in a neighboring DPE 114 to connect to and further form the stream interconnect network of the DPE array 102. Stream switches in neighboring tiles 118 are capable of exchanging data horizontally. The stream switch 302 is capable of communicating with the DPE 114 immediately above the tile 118. The stream switch 302 is also connected to and may communicate with a PL interface 304, a DMA engine 306, and/or a NoC stream interface 308 via a stream multiplexer/demultiplexer ("stream mux/demux") 310.

The stream switch 302 is configurable by configuration data loaded into configuration registers 312. The stream switch 302, for example, may be configured to support packet-switched and/or circuit-switched operation based upon the configuration data. Further, the configuration data defines the particular DPE and/or DPEs within DPE array 102 to which stream switch 302 communicates.

The stream multiplexer/demultiplexer 310 is capable of directing data received from the PL interface 304, DMA engine 306, and/or NoC stream interface 308 to the stream switch 302. Similarly, the stream multiplexer/demultiplexer 310 is capable of directing data received from the stream switch 302 to the PL interface 304, DMA engine 306, and/or to NoC stream interface 308. The stream multiplexer/demultiplexer 310 may be programmed by configuration data stored in the configuration registers 312 to route selected data to the PL interface 304, to the DMA engine 306 where such data is sent over the programmable network 128 of the NoC 112 as memory mapped packets, and/or to the NoC stream interface 308 where the data is sent over the programmable network 128 of the NoC 112 as a data stream.

The PL interface 304 couples to the PL 106 of the SoC 100 and provides an interface thereto. The PL interface 304 couples directly to one or more programmable interconnect elements and/or boundary logic interfaces (BLIs) (e.g., generically, one or more PL interconnect blocks 314) in the PL 106. Data streams communicated via the stream switch 302 can be communicated with the PL interface 304, which further can be communicated with the PL 106, e.g., without a logical transformation of the data stream between the stream switch 302 and the PL 106. No data transformation circuit intervenes in a data stream communication path between the stream interconnect network and the PL 106. The stream switch 302, and more particularly, the stream interconnect network, can be tightly coupled with the PL 106. In some examples, the PL interface 304 is further coupled to other types of circuit blocks and/or subsystems to be capable of transferring data between tile 118 and such other subsystems and/or blocks.

The DMA engine 306 is capable of operating to direct data into the programmable network 128 of the NoC 112 through a selector block 316 and on to an NMU and/or NSU (e.g., generically, a NoC interface(s) 318). The DMA engine 306 is capable of receiving data from DPEs (via the stream interconnect network) and providing such data to the programmable network 128 of the NoC 112 as memory mapped packets.

In some examples, the DMA engine 306 is capable of accessing an external memory. For example, DMA engine 306 is capable of receiving data streams from DPEs and sending the data stream to external memory through the programmable network 128 of the NoC 112 to a memory controller located within the SoC 100. The memory controller then directs the data received as data streams to the external memory (e.g., initiates reads and/or writes of the external memory as requested by DMA engine 306). Similarly, DMA engine 306 is capable of receiving data from external memory where the data may be distributed to other tile(s) 118 of SoC interface block 116 and/or up into target DPEs 114.

The NoC stream interface 308 is capable of receiving data from the programmable network 128 of the NoC 112 via the NoC interface(s) 318 and forwarding the data to the stream multiplexer/demultiplexer 310. The NoC stream interface 308 is further capable of receiving data from stream multiplexer/demultiplexer 310 and forwarding the data to NoC interface 318 through the selector block 316. The selector block 316 is configurable to pass data from the DMA engine 306 or from NoC stream interface 308 on to NoC interface(s) 318.

The tile 118 includes a memory mapped switch 320. The memory mapped switch 320 connects vertically to the memory mapped switch (MMS) of the DPE immediately above, which permits, for example, the memory mapped switch 320 to be capable of communicating with the column of DPEs 114 above the tile 118 and to further form the memory mapped interconnect network of the DPE array 102. The memory mapped switch 320 connects horizontally to memory mapped switches (MMS) in neighboring tiles 118, which permits, for example, the memory mapped switch 320 to be capable of moving data (e.g., configuration and control data) from one tile to another to reach a target column of DPEs 114 and direct the data to the target DPE 114 within the column. The memory mapped switch 320 may also connect to configuration registers 312 within tile 118. Through memory mapped switch 320, configuration data may be loaded into configuration registers 312 to control various functions and operations performed by components within tile 118. The memory mapped switch 320 is coupled to NoC interface(s) 318 via bridge 322. The bridge 322 is capable of converting memory mapped data transfers from the programmable network 128 of the NoC 112 (e.g., configuration and control data) into memory mapped packets that may be received by memory mapped switch 320. Some tiles 118 can omit connections to NoC interface(s) 318, and hence, can omit the stream mux/demux 310 (e.g., with a direct connection between the stream switch 302 and the PL interface 304), DMA engine 306, NoC stream interface 308, selector block 316, and bridge 322. The PS 104 or any other subsystem or circuit block can communicate with, e.g., a core 202 or memory module 204 of any DPE 114 via the memory mapped interconnect network of the DPE array 102.

Figure 4:
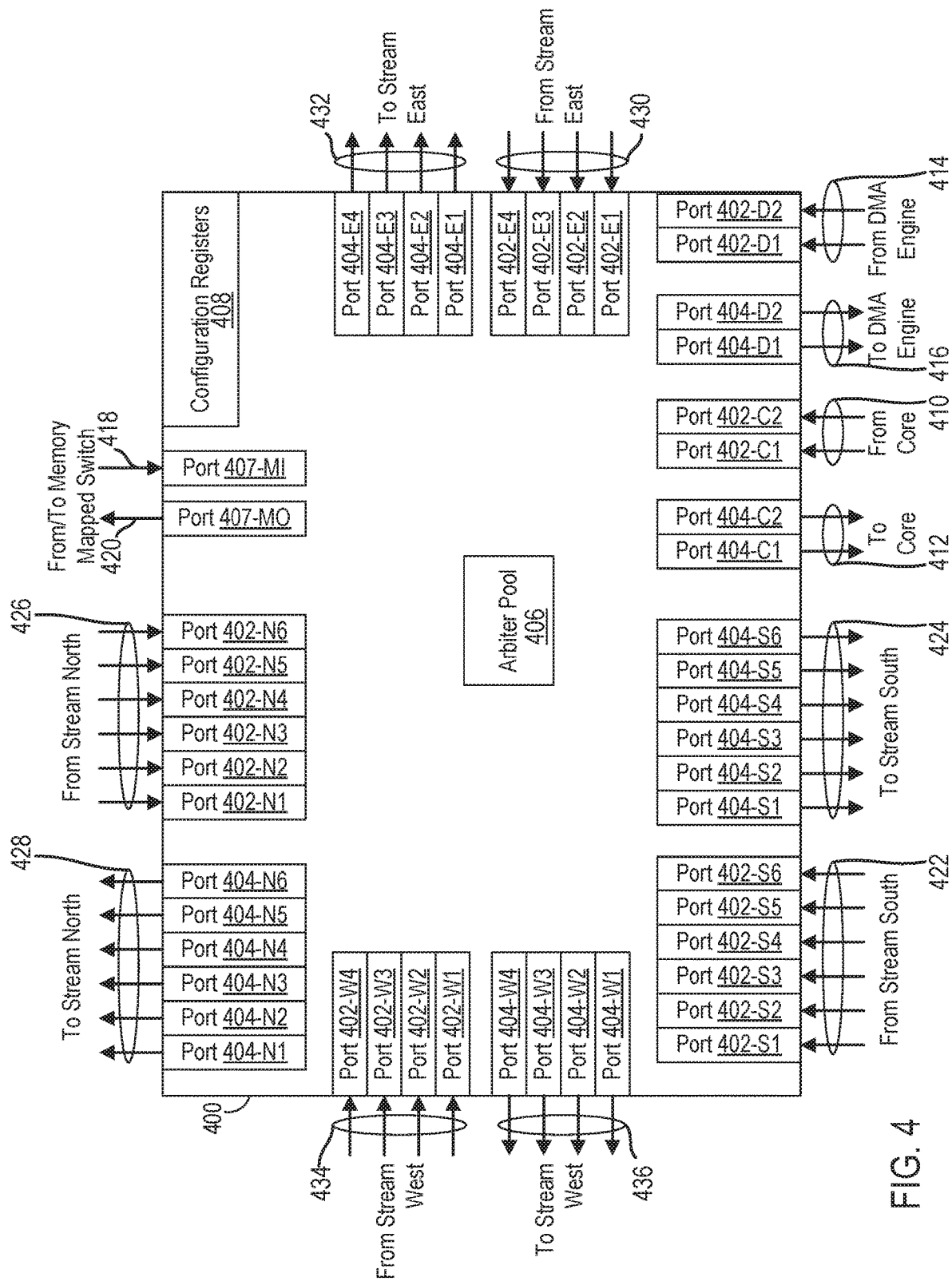
FIG. 4 depicts an architecture for a stream switch according to some examples.

FIG. 4 illustrates an architecture for a stream switch 400 according to some examples. The stream switch 400 may be implemented as any of the stream switches 220, 302. The stream switch 400 includes stream input (e.g., slave) ports 402 and stream output (e.g., master) ports 404 that each are an interface for a data stream. Generally, each port 402, 404 is specifically designated in FIG. 4 by an indication of a cardinal direction with which the port 402, 404 is associated or DPE or tile local component to which the port 402, 404 is connected. As shown, "N" indicates a north connection; "E" indicates an east connection; "D" indicates a connection with a DMA engine internal to the DPE; "C" indicates a connection with a core internal to the DPE; "S" indicates a south connection; and "W" indicates a west connection. Additionally, each port 402, 404 is distinguished from other ports 402, 404 having a similar input or output connection. For example, input port 402-W4 is the fourth input port connected in the west cardinal direction. Additionally, the stream switch 400 includes memory mapped input (e.g., slave) port 407-MI and memory mapped output (e.g., master) port 407-MO that each are an interface for memory mapped transactions, e.g., to write or read configuration registers 408.

The stream switch 400 includes an arbiter pool 406 that arbitrates between data streams from input ports 402 and determines to which output ports 404 to provide access to the data streams. The stream switch 400 further includes configuration registers 408, which may be configuration registers 222, 312.

Two input connections 410 are connected from a core 202 to respective input ports 402-C1, 402-C2, and two output connections 412 are connected to the core 202 from respective output ports 404-C1, 404-C2. Two input connections 414 are connected from a DMA engine to respective input ports 402-D1, 402-D2, and two output connections 416 are connected to the DMA engine from respective output ports 404-D1, 404-D2. The connections 410, 412, 414, 416 may be for a stream switch 220 in a DPE 114, and may be omitted for a stream switch 302 in a tile 118. An input connection 418 is connected from a memory mapped switch, such as memory mapped switch 224, 320, to the memory mapped input port 407-MI, and an output connection 420 is connected to the memory mapped switch from the memory mapped output port 407-MO. The connections 418, 420 may be for reading or writing to the configuration registers 408. Other numbers of connections and ports may be implemented.

A number (e.g., six) of input connections 422 are connected from a stream south, such as a stream switch 220, 302 in a DPE 114 or tile 118 below or a stream multiplexer/demultiplexer 310, to input ports 402-S1 through 402-S6. Each of the input connections 422 is connected to a respective stream output port of a stream switch disposed in a DPE 114 or tile 118 neighboring, in a south direction, the DPE 114 or tile 118 in which the stream switch 400 is disposed. A number (e.g., six) of output connections 424 are connected to a stream south, such as a stream switch 220, 302 in a DPE 114 or tile 118 below or a stream multiplexer/demultiplexer 310, from output ports 404-S1 through 404-S6. Each of the output connections 424 is connected to a respective stream input port of a stream switch (or stream multiplexer/demultiplexer 310) disposed in a DPE 114 or tile 118 neighboring, in a south direction, the DPE 114 or tile 118 in which the stream switch 400 is disposed.

A number (e.g., six) of input connections 426 are connected from a stream north, such as a stream switch 220 in a DPE 114 above, to input ports 402-N1 through 402-N6. Each of the input connections 426 is connected to a respective stream output port of a stream switch disposed in a DPE 114 or tile 118 neighboring, in a north direction, the DPE 114 or tile 118 in which the stream switch 400 is disposed. A number (e.g., six) of output connections 428 are connected to a stream north, such as a stream switch 220 in a DPE 114 above, from output ports 404-N1 through 404-N6. Each of the output connections 428 is connected to a respective stream input port of a stream switch disposed in a DPE 114 or tile 118 neighboring, in a north direction, the DPE 114 or tile 118 in which the stream switch 400 is disposed.

A number (e.g., four) of input connections 430 are connected from a stream east, such as a stream switch 220, 302 in a DPE 114 or tile 118 to the right, to input ports 402-E1 through 402-E4. Each of the input connections 430 is connected to a respective stream output port of a stream switch disposed in a DPE 114 or tile 118 neighboring, in an east direction, the DPE 114 or tile 118 in which the stream switch 400 is disposed. A number (e.g., four) of output connections 432 are connected to a stream east, such as a stream switch 220, 302 in a DPE 114 or tile 118 to the right, from output ports 404-E1 through 404-E4. Each of the output connections 432 is connected to a respective stream input port of a stream switch disposed in a DPE 114 or tile 118 neighboring, in an east direction, the DPE 114 or tile 118 in which the stream switch 400 is disposed.

A number (e.g., four) of input connections 434 are connected from a stream west, such as a stream switch 220, 302 in a DPE 114 or tile 118 to the left, to input ports 402-W1 through 402-W4. Each of the input connections 434 is connected to a respective stream output port of a stream switch disposed in a DPE 114 or tile 118 neighboring, in a west direction, the DPE 114 or tile 118 in which the stream switch 400 is disposed. A number (e.g., four) of output connections 436 are connected to a stream west, such as a stream switch 220, 302 in a DPE 114 or tile 118 to the left, from output ports 404-W1 through 404-W4. Each of the output connections 436 is connected to a respective stream input port of a stream switch disposed in a DPE 114 or tile 118 neighboring, in a west direction, the DPE 114 or tile 118 in which the stream switch 400 is disposed. Any number of connections and ports may be implemented.

Each of the ports 402, 404 and arbiter pool 406 can be configured for circuit-switched operation or packet-switched operation by, e.g., a packet enable bit written to the configuration registers 408 corresponding to the respective port 402, 404. When a port 402, 404 is configured for circuit-switched operation, the port 402, 404 can handle a single data stream. A circuit-switched stream generally cannot share physical resources, such as a port 402, 404, with another data stream. A circuit-switched stream can be a one-to-one or one-to-many data stream having one source and one or many destinations. Each output port 404 has a corresponding value in the configuration registers 408 that identifies the corresponding input port 402 when the output port 404 is configured in circuit-switched operation. One or more output ports 404 can have a value in the configuration registers 408 that identifies the same input port 402 for a one-to-many data stream.

When a port 402, 404 is configured for packet-switched operation, the port 402, 404 may be able to handle multiple packet-switched (e.g., logical) streams. Packet-switched streams may be able to share physical resources, such as a port 402, 404, e.g., as long as the cumulative utilization of the shared physical resources does not exceed the capacity of the shared physical resources. A packet-switched stream includes a packet header that includes a packet identification (ID). An arbiter of the arbiter pool 406 is capable of routing a packet-switched stream to a specified output port 404 based on the input port 402 on which the packet-switched stream was received and based on the packet ID. The routing information can be written to the configuration registers 408. Accordingly, multiple packet-switched streams may share a port 402, 404 of a stream switch 400 since the multiple packet-switched streams may be individually routed based on respective packet IDs. In some examples, cores 202 of DPEs 114 and DMA engines 216 of memory modules 204 of DPEs 114 are capable of appending a packet header in a packet-switched stream.

Packet-switched operation permits many permutations of topologies within a stream switch 400. A packet-switched stream may be routed from a single input port 402 to a single output port 404. A packet-switched stream may be routed from a single input port 402 to multiple output ports 404. A packet-switched stream may be routed from multiple input ports 402 to a single output port 404. A packet-switched stream may be routed from multiple input ports 402 to multiple output ports 404.

Following figures illustrate various connections that can be selectively implemented in a stream switch 400. The stream switch 400 includes circuitry, such as multiplexers, that can be configured to selectively connected stream input ports 402 and stream output ports 404 as described below. Various circuits can be implemented in these connections, such as buffers, which can enable, e.g., packet-switched operations. The following figures illustrate which connections the hardware architecture permits to be made. The actual connections that are made in operation can be selective, such as based on configuration data stored in configuration registers 408 (e.g., which can cause a control signal to be applied to a control node of a multiplexer). For example, when a stream input port 402 is connected to one or more stream output ports 404 by circuit-switched operation, configuration data in the configuration register 408 can identify the ports 402, 404 that are connected in the circuit-switched operation, and the stream switch 400 connects those ports 402, 404. Such a connection can persist while the configuration data is stored in the configuration registers 408. In a packet-switched operation, which ports 402, 404 are connected can be dynamically determined during operation. The configuration registers 408 can store routing tables that can identify to which stream output port 404 a data stream packet is routed, and hence, which input port 402 is connected to which output port 404, based on from which input port 402 the data stream packet is received and an packet ID of the data stream packet.

Figure 5A:
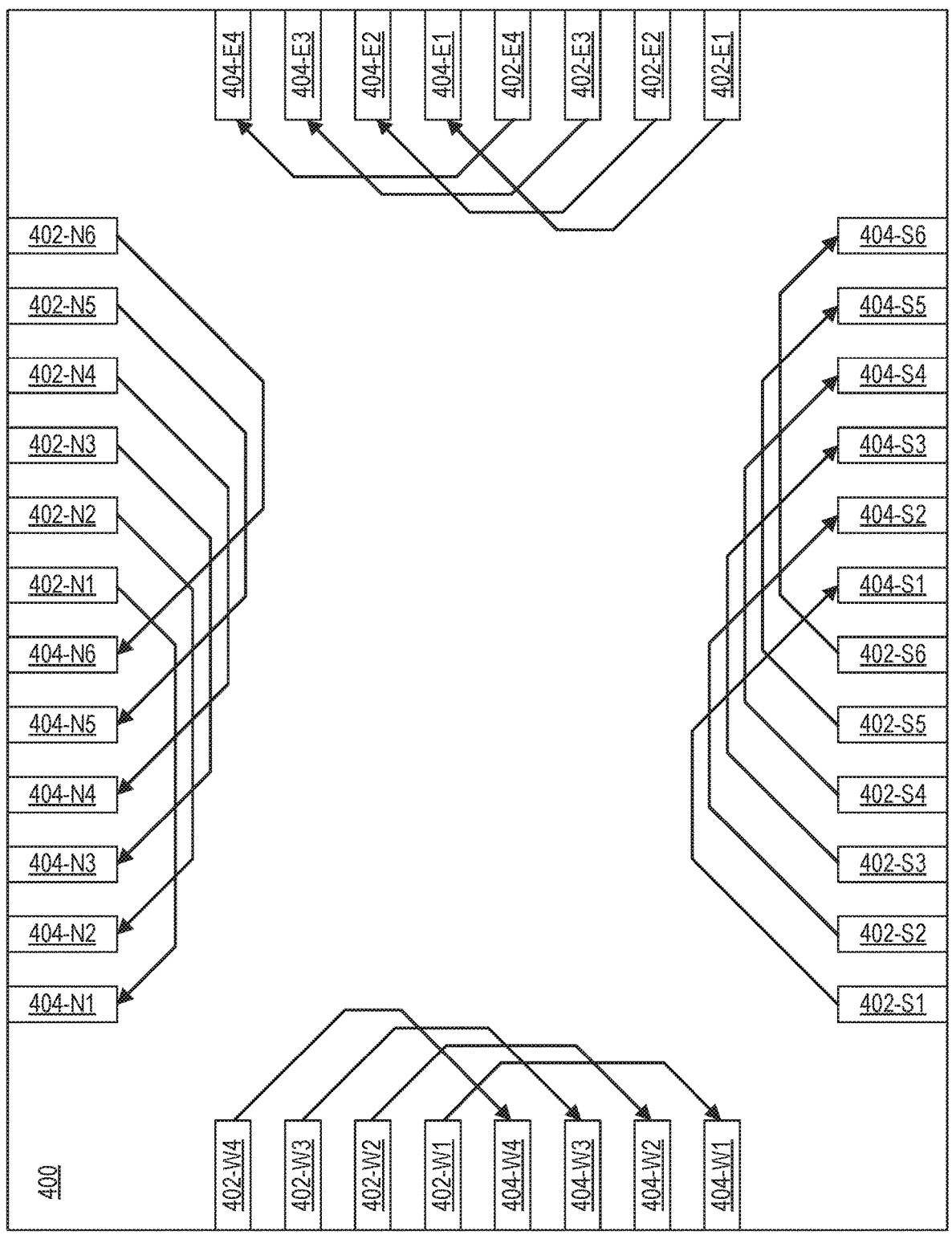
FIGS. 5A and 5B depict connections that can be selectively formed between various stream input ports and stream output ports of a stream switch according to some examples.
Figure 5B:
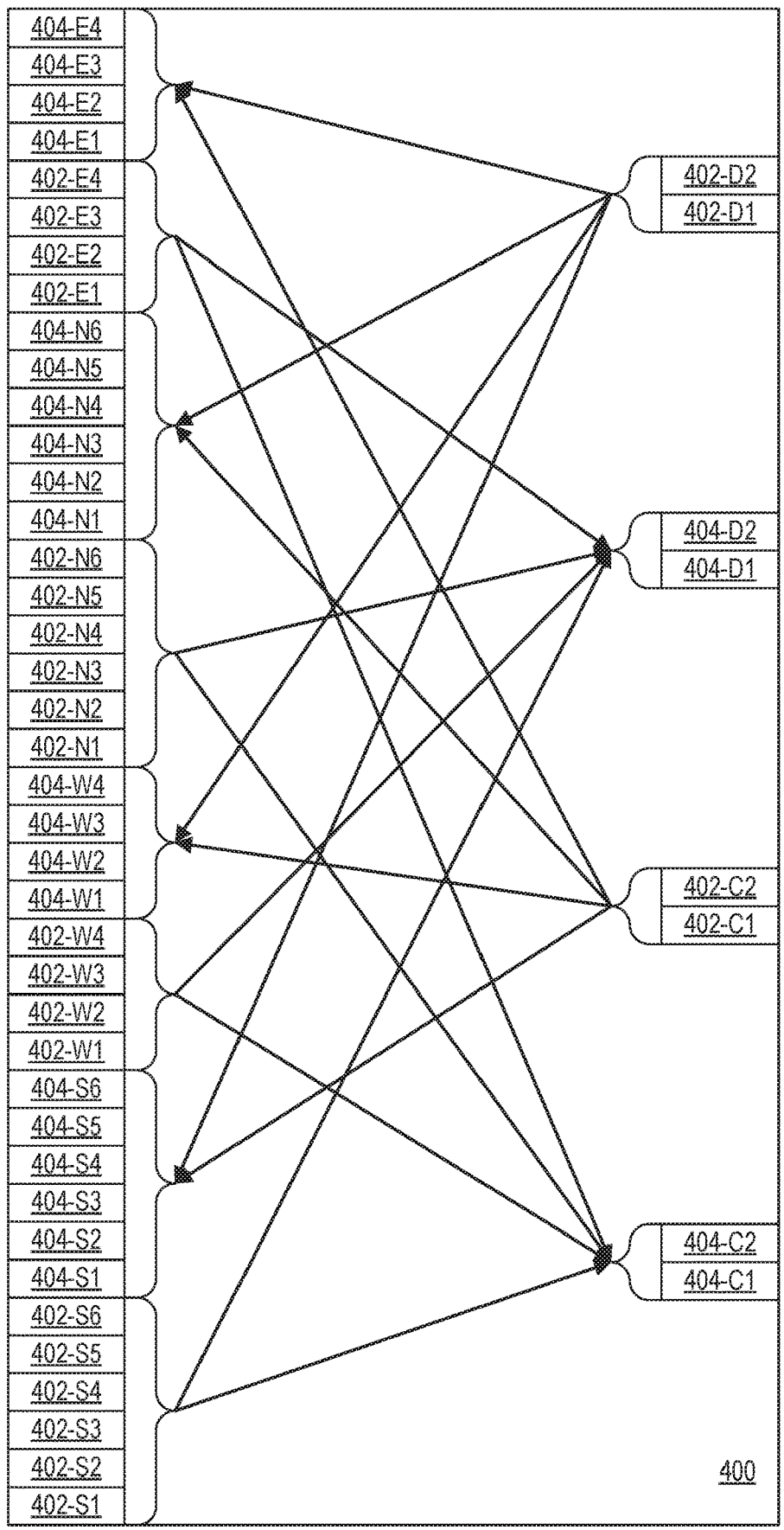

FIGS. 5A and 5B illustrate connections that can be selectively formed between various stream input ports 402 and stream output ports 404 of a stream switch 400 according to some examples. FIG. 5A illustrates loopback connections from and to cardinal directions. A one-to-one loopback scheme is implemented in the stream switch 400. For example, each input port 402 associated with a cardinal direction is connected, through the stream switch 400, to one (e.g., no more than one) corresponding output port 404 associated with that same cardinal direction. As illustrated, the first north input port 402-N1 is connected to the first north output port 404-N1; the first south input port 402-S1 is connected to the first south output port 404-S1; the first east input port 402-E1 is connected to the first east output port 404-E1; and the first west input port 402-W1 is connected to the first west output port 404-W1. FIG. 5B illustrates connections from stream input ports 402 and stream output ports 404 associated with cardinal directions between stream input ports 402 and stream output ports 404 to and from a core and DMA engine in the DPE. Generally, any input port 402 associated with a cardinal direction can be connected to any core output port 404-C1, 404-C2, and any core input port 402-C1, 402-C2 can be connected to any output port 404 associated with a cardinal direction. Also, any input port 402 associated with a cardinal direction can be connected to any DMA engine output port 404-D1, 404-D2, and any DMA engine input port 402-D1, 402-D2 can be connected to any output port 404 associated with a cardinal direction.

Figure 6:
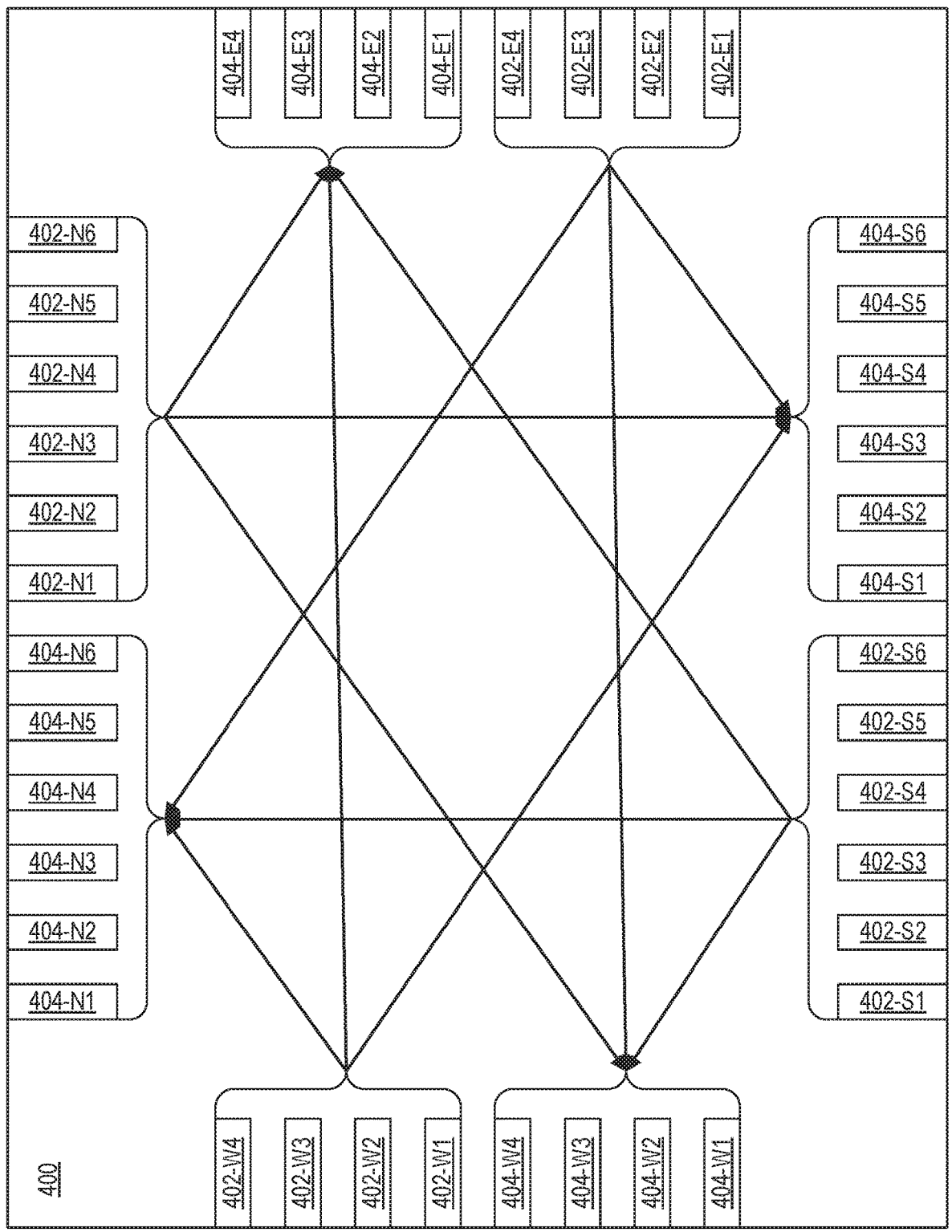
FIG. 6 depicts connections that can be selectively formed between stream input ports and stream output ports associated with different cardinal directions of a stream switch according to some examples.

FIG. 6 illustrates connections that can be selectively formed between stream input ports 402 and stream output ports 404 associated with different cardinal directions of a stream switch 400 according to some examples. Generally, as shown in FIG. 6, any input port 402 associated with a cardinal direction can be connected to any output port 404 associated with each cardinal direction that is different from the cardinal direction associated with the respective input port 402.

Figure 7:
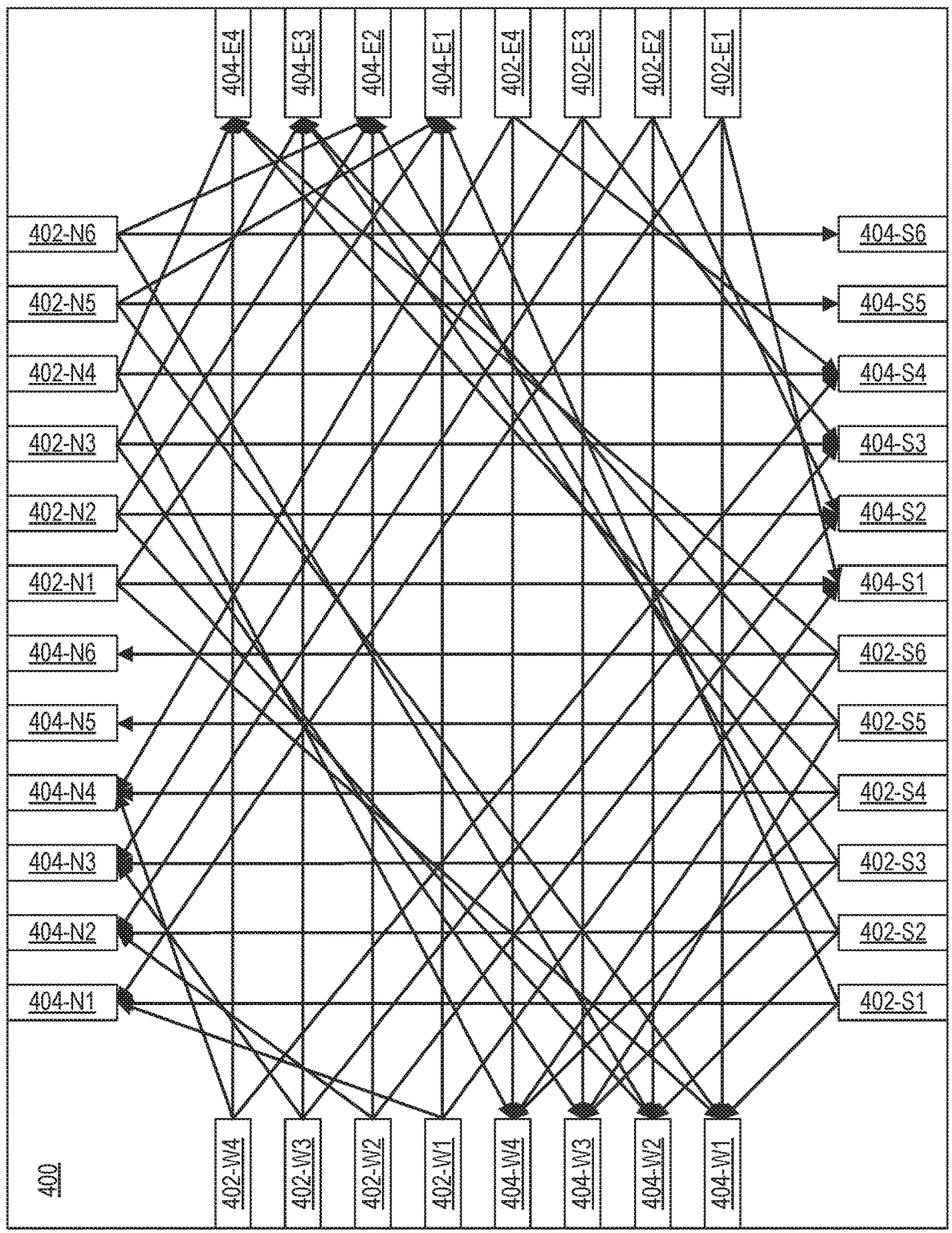
FIG. 7 illustrates connections that can be selectively formed between input ports and output ports associated with different cardinal directions of a stream switch according to some examples.

FIG. 7 illustrates connections that can be selectively formed between stream input ports 402 and stream output ports 404 associated with different cardinal directions of a stream switch 400 according to some examples. Generally, as shown in FIG. 6, each input port 402 associated with a cardinal direction can be connected to one (e.g., no more than one) output port 404 associated with each cardinal direction that is different from the cardinal direction of the respective input port 402. For example, the first north input port 402-N1 is connected to each of the first east output port 404-E1, the first south output port 404-S1, and the first west output port 404-W1.

In some examples, the connections illustrated in FIGS. 5A, 5B, and 6 can be implemented in a stream switch. The stream switch implements a less-than-full crossbar switch. A full crossbar switch in the context of FIG. 4 would permit each stream input port 402 to be connected to each stream output port 404. If the stream switch 400 has M number of stream input ports 402 and N number of stream output ports 404, a full crossbar switch would be a M×N cross bar switch, which could be implemented by N number of M:1 multiplexers, where each multiplexer has an output node connected to a respective output port 404 and has input nodes connected to respective ones of each input port 402. In the illustrated stream switch 400 of FIG. 4, a full crossbar switch could be implemented by 24 multiplexers that are each a 24:1 multiplexer. A less-than-full crossbar switch implementing the connections of FIGS. 5A, 5B, and 6 can be implemented by N number of multiplexers, where for X number of output ports 404-Nx, 404-Sx, 404-Ex, 404-Wx associated with a cardinal direction, X number of [M−(P−1)]:1 multiplexers are implemented, and for Y number of output ports 404-Cx, 404-Dx to a core or DMA engine local to the DPE, Y number of [M−R]:1 multiplexers are implemented. P is the number of input ports 402-Nx, 402-Sx, 402-Ex, 402-Wx associated with the cardinal direction of the output port 404-Nx, 404-Sx, 404-Ex, 404-Wx to which the multiplexer is connected, and R is the number of input ports 402-Cx, 402-Dx from a core or DMA engine internal to the DPE. In the illustrated stream switch 400 of FIG. 4, the less-than-full crossbar switch implementing FIGS. 5A, 5B, and 6 can include respective 19:1 multiplexers having output nodes connected to north and south output ports 404-Nx, 404-Sx, respective 21:1 multiplexers having output nodes connected to east and west output ports 404-Ex, 404-Wx, and respective 20:1 multiplexers having output nodes connected to core and DMA engine output ports 404-Cx, 404-Dx.

In some examples, the connections illustrated in FIGS. 5A, 5B, and 7 can be implemented in a stream switch. The stream switch implements a less-than-full crossbar switch. A less-than-full crossbar switch implementing the routings or connections of FIGS. 5A, 5B, and 7 can be implemented by N number of multiplexers. The number of multiplexers and ratio of input to output can vary based on the architecture of the stream switch 400 (e.g., number of input and output ports associated with any cardinal direction). In the illustrated stream switch 400 of FIG. 4, the less-than-full crossbar switch implementing FIGS. 5A, 5B, and 6 can include respective 9:1 multiplexers having output nodes connected to east and west output ports 404-Ex, 404-Wx, respective 8:1 multiplexers having output nodes connected to north and south output ports 404-N1 through 404-N4, 404-S1 through 404-S4, respective 6:1 multiplexers having output nodes connected to north and south output ports 404-N5, 404-N6, 404-S5, 404-S6, and respective 20:1 multiplexers having output nodes connected to core and DMA engine output ports 404-Cx, 404-Dx.

The reduced number of inputs of the multiplexers in the above less-than-full crossbar switches can result in a reduced area in which to implement a less-than-full crossbar switch compared to a full crossbar switch. Further, the reduced number of inputs of the multiplexers can consume reduced power relative to a full crossbar switch. In an architecture of the DPE array 102 as described above, such reductions in area and power consumption can be amplified based on the number of stream switches implemented in the DPE array 102.

Figure 8:
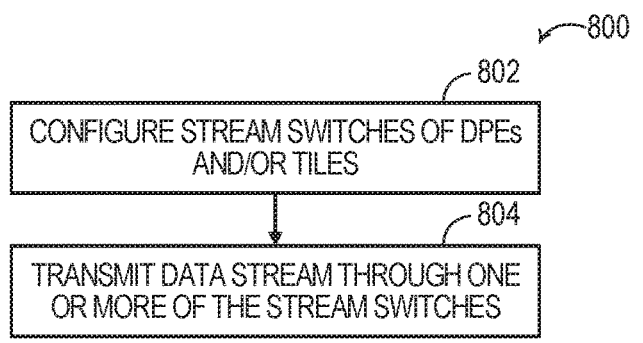
FIG. 8 is a flowchart of a method for operating a programmable device according to some examples.

FIG. 8 is a flowchart of a method 800 for operating a programmable device according to some examples. The method 800 can be performed on a programmable device such as described above. At block 802, stream switches of DPEs and/or tiles are configured. More broadly, the DPEs and tiles are configured. Configuring the DPEs and tiles, including configuring the stream switches, can be by memory mapped transactions routed through the memory mapped interconnect network to respective target DPEs and tiles. Configuration data can be written to configuration registers to configure the stream switches. The stream switches can be configured in a circuit-switched mode to selectively connect stream input port(s) and stream output port(s) of the respective stream switch, and/or can be configured in a packet-switched mode such that various stream input port(s) and stream output port(s) of the respective stream switch can be dynamically selectively connected during operation. A stream switch can implement some input and output ports in a circuit-switched mode and other input and output ports in a packet-switched mode. Any given application can cause any number of DPEs and tiles to be configured.

At block 804, a data stream is transmitted through one or more of the switches. A data stream is transmitted through a stream switch from a stream input port of the stream switch of the DPE or tile to a stream output port of the stream switch of the DPE or tile based on the configuration of the stream switch of the DPE or tile. The data stream can be transmitted from a stream input port to a stream output port in a circuit-switched operation, by which the stream input port and stream output port are connected as indicated by configuration data stored in the configuration register. The data stream can be transmitted from a stream input port to a stream output port in a packet-switched operation, where the stream input port and stream output port are dynamically connected based on the stream input port and packet ID of the data stream as indicated by a routing table stored in the configuration register.

While the foregoing is directed to specific examples, other and further examples may be devised without departing from the basic scope thereof, and the scope thereof is determined by the claims that follow.

What is claimed is:

1. A programmable device comprising:
 a plurality of data processing engines (DPEs), each DPE of the DPEs comprising a memory module, the memory module including a memory bank and a direct memory address (DMA) engine, each DPE of the DPEs comprising:
 a hardened processor core; and
 a stream switch connected to respective stream switches of ones of the DPEs that neighbor the respective DPE in respective ones of directions, the stream switch having input ports associated with each direction of the directions and having output ports associated with each direction of the directions, wherein for each direction of the directions, each input port of the input ports associated with the respective direction is selectively connectable to one of the output ports associated with the respective direction, and to one or more output ports connected to the DMA engine of the neighboring DPE.

2. The programmable device of claim 1, wherein for each stream switch of the stream switches and each direction of the directions, each input port of the input ports associated with the respective direction is selectively connectable to each output port of the output ports associated with other directions of the directions that are different from the respective direction.

3. The programmable device of claim 1, wherein for each stream switch of the stream switches and each direction of the directions, each input port of the input ports associated with the respective direction is selectively connectable to one output port of the output ports associated with each other direction of the directions that are different from the respective direction.

4. The programmable device of claim 1, wherein:
 each stream switch of the stream switches further has one or more input ports connected to the core of the respective DPE and has one or more output ports connected to the core of the respective DPE; and
 for each stream switch of the stream switches and each direction of the directions:
 each input port of the input ports associated with the respective direction is selectively connectable to each output port of the one or more output ports connected to the core; and
 each input port of the one or more input ports connected to the core is selectively connectable to each output port of the output ports associated with the respective direction.

5. The programmable device of claim 1, wherein:
 each stream switch of the stream switches further has one or more input ports connected to the DMA engine of the respective DPE and has one or more output ports connected to the DMA engine of the respective DPE; and
 for each stream switch of the stream switches and each direction of the directions:
 each input port of the one or more input ports connected to the DMA engine is selectively connectable to each output port of the output ports associated with the respective direction.

6. The programmable device of claim 1, wherein each stream switch of the stream switches is configurable to selectively connect one or more input ports to one or more output ports in a packet-switched mode or a circuit-switched mode.

7. The programmable device of claim 1 further comprising interface tiles, each interface tile of the interface tiles including a stream switch connected to a stream switch of a neighboring one of the plurality of DPEs.

8. The programmable device of claim 7 further comprising:
 a processing system;
 a programmable logic region connected to the interface tiles, no data transformation circuit intervening in a data stream communication path between the stream switches of the interface tiles and the programmable logic region; and
 a Network-on-Chip (NoC) connected to and between the interface tiles, the processing system, and the programmable logic region.

9. A method for operating a programmable device, the method comprising:
 configuring a data processing engine (DPE), the DPE being one of a plurality of DPEs, each DPE of the plurality of DPEs further comprises a memory module, the memory module including a memory bank and direct memory address (DMA) engine, each DPE of the plurality of DPEs including a hardened processor core and a stream switch, the stream switch being connected to respective stream switches of ones of the plurality of DPEs that neighbor the DPE in respective ones of directions, the stream switch having input ports associated with each direction of the directions and having output ports associated with each direction of the directions, wherein for each direction of the directions, each input port of the input ports associated with the respective direction is selectively connectable to one of the output ports associated with the respective direction, and to one or more output ports connected to the DMA engine of the neighboring DPE, wherein configuring the DPE includes configuring the stream switch of the DPE; and transmitting a data stream from an input port of the stream switch of the DPE to an output port of the stream switch of the DPE based on the configuration of the stream switch of the DPE.

10. The method of claim 9, wherein for each stream switch of the stream switches and each direction of the directions, each input port of the input ports associated with the respective direction is selectively connectable to each output port of the output ports associated with other directions of the directions that are different from the respective direction.

11. The method of claim 9, wherein for each stream switch of the stream switches and each direction of the directions, each input port of the input ports associated with the respective direction is selectively connectable to one output port of the output ports associated with each other direction of the directions that is different from the respective direction.

12. The method of claim 9, wherein:

each stream switch of the stream switches further has one or more input ports connected to the core of the respective DPE and has one or more output ports connected to the core of the respective DPE; and for each stream switch of the stream switches and each direction of the directions:
  each input port of the input ports associated with the respective direction is selectively connectable to each output port of the one or more output ports connected to the core; and
  each input port of the one or more input ports connected to the core is selectively connectable to each output port of the output ports associated with the respective direction.

13. The method of claim 9, wherein:

each stream switch of the stream switches further has one or more input ports connected to the DMA engine of the respective DPE and has one or more output ports connected to the DMA engine of the respective DPE; and for each stream switch of the stream switches and each direction of the directions:
  each input port of the one or more input ports connected to the DMA engine is selectively connectable to each output port of the output ports associated with the respective direction.

14. The method of claim 9, wherein configuring the stream switch of the DPE includes configuring the stream switch of the DPE to selectively connect one or more input ports to one or more output ports in a packet-switched mode or a circuit-switched mode.

15. The method of claim 9, wherein configuring the stream switch of the DPE includes writing to a configuration register of the DPE.

16. A programmable device comprising:

a plurality of data processing engines (DPEs), each DPE of the DPEs comprising:
  a hardened processor core;
  a memory module, the memory module including a memory bank and direct memory address (DMA) engine; and
  a stream switch connected to respective stream switches of ones of the DPEs that neighbor the respective DPE in respective ones of directions, the stream switch comprising:
    first input ports associated with each direction of the directions and connected to a stream switch of a respective one of the DPEs that neighbors the respective DPE in the respective direction;
    first output ports associated with each direction of the directions and connected to a stream switch of a respective one of the DPEs that neighbors the respective DPE in the respective direction;
    one or more second input ports connected to the core;
    one or more second output ports connected to the core;
    one or more third input ports connected to the memory module; and
    one or more third output ports connected to the memory module; and
  wherein for each direction of the directions, each first input port of the first input ports associated with the respective direction is selectively connectable to no more than one of the first output ports associated with the respective direction and to each of the one or more third output ports connected to the memory module.

17. The programmable device of claim 16, wherein for each stream switch of the stream switches and each direction of the directions, each first input port of the first input ports associated with the respective direction is selectively connectable to each first output port of the first output ports of other directions of the directions that are different from the respective direction.

18. The programmable device of claim 16, wherein for each stream switch of the stream switches and each direction of the directions, each first input port of the first input ports associated with the respective direction is selectively connectable to one first output port of the first output ports associated with each other direction of the directions that is different from the respective direction.

19. The programmable device of claim 16, wherein for each stream switch of the stream switches and each direction of the directions:

each first input port of the first input ports associated with the respective direction is selectively connectable to each second output port of the one or more second output ports;

each second input port of the one or more second input ports is selectively connectable to each first output port of the first output ports associated with the respective direction; and each third input port of the one or more third input ports is selectively connectable to each first output port of the first output ports associated with the respective direction.

20. The programmable device of claim 16 further comprising:
- interface tiles, each interface tile of the interface tiles including a stream switch connected to a stream switch of a neighboring one of the DPEs;
- a processing system;
- a programmable logic region connected to the interface tiles; and
- a Network-on-Chip (NoC) connected to and between the interface tiles, the processing system, and the programmable logic region.

* * * * *